(12) United States Patent
Bush

(10) Patent No.: US 6,640,395 B2
(45) Date of Patent: Nov. 4, 2003

(54) CONNECTING DEVICE FOR FABRIC VEHICLE COVERS

(76) Inventor: James Newman Bush, 618 Ivy St., Truth or Consequences, NM (US) 87910

(*) Notice: Subject to any disclaimer, the term of this patent is extended or adjusted under 35 U.S.C. 154(b) by 0 days.

(21) Appl. No.: 10/162,249

(22) Filed: Jun. 3, 2002

(65) Prior Publication Data

US 2002/0190446 A1 Dec. 19, 2002

Related U.S. Application Data

(60) Provisional application No. 60/295,960, filed on Jun. 4, 2001.

(51) Int. Cl.[7] .............................................. A44B 21/00
(52) U.S. Cl. ............................ 24/68 CD; 403/109.3; 24/68 R; 24/71.1
(58) Field of Search .................... 24/68 CD, 71.1, 24/68 R; 403/109.1, 109.2, 109.3, 109.5, 109.8, 377; 254/197

(56) References Cited

U.S. PATENT DOCUMENTS

| 3,987,807 A | * | 10/1976 | Varnell |
| 4,343,567 A | * | 8/1982 | Sarver et al. .................. 404/10 |
| 4,367,663 A | * | 1/1983 | Merics ........................ 81/177.2 |
| 4,512,600 A | * | 4/1985 | King ............................ 292/338 |
| 4,753,259 A | * | 6/1988 | Hansen et al. ................. 135/68 |
| 5,282,555 A | * | 2/1994 | Muir et al. ............. 403/391 X |
| 5,593,239 A | * | 1/1997 | Sallee ........................ 403/109 |

* cited by examiner

Primary Examiner—Robert J. Sandy

(57) ABSTRACT

A telescoping and tensioning connecting device for fabric vehicle covers assembled from a number of inter-received tubular members, which are slidably connected to a primary housing tube. A coiled compression spring, positioned within the primary housing tube provides tension and hook devices at each end of the apparatus engage "eyelets" of a fabric vehicle cover thus snugging and holding the cover to the vehicle.

10 Claims, 2 Drawing Sheets

CONNECTING DEVICE FOR FABRIC VEHICLE COVERS

CROSS-REFERENCE TO RELATED APPLICATIONS

This application is entitled to the benefit of Provisional Patent Application Ser. No. 60/295,960, filed Jun. 4, 2001.

BACKGROUND

1. Field of Invention

This invention relates to connecting devices, specifically to those connecting devices, used to secure fabric vehicle covers onto automobiles.

2. Description of Prior Art

Fabric covers are used by many people in order to protect the finish of an automobile or other vehicle. These fabric covers are manufactured in the general shape and size of the vehicle so as to fit reasonably snugly over the vehicle. These covers typically contain two "eyelets" which are sewn or pressed into the lower edge of the fabric opposite each other and at that portion of the cover which covers the rocker panel area of the automobile. These "eyelets" are provided on the cover to accommodate a connecting device and thus further snug the cover to the vehicle. Thus, the connecting device employed, prevents a wind or other unauthorized lifting of the cover off of the vehicle.

Heretofore, these covers were secured to the vehicle by the use of a rope, a cable, an elastic cord with hooks, or the like, slung under the vehicle between and connecting the two "eyelets". While these methods of attachment are certainly usable, they are merely adequate and indeed because of the inherent flexible nature of these current attachment devices (rope, cable, elastic cord with hooks, or the like), a flaw is shown.

Thus the current attachment methods suffer from several disadvantages:

(a) The nature of a rope, cable, elastic cord with hooks, or the like, makes for a somewhat awkward storage problem when not in use.

(b) The nature of the current method of attachment because of the current devices, requires that the user be on hands and knees in order to facilitate throwing or otherwise uncoiling the device under the vehicle from one side to the other. In the case of an elastic cord, the user would engage a hook through the eyelet on one side of the cover and then proceed around to the other side of the vehicle. The user would then be required to crawl part way under the vehicle to retrieve the free end of the elastic cord and then to stretch and hook it to the eyelet on that side.

(c) While it is true that the elastic cord is self-tensioning and thus snugs the cover to the vehicle, it is nevertheless an awkward means of achieving that end.

SUMMARY

In accordance with the present invention, a connecting device for fabric vehicle covers comprises a tubular body of rigid or semi-rigid construction with telescoping, tensioning, and gripping apparatus.

OBJECTS AND ADVANTAGES

Accordingly, several objects and advantages of the present invention are:

(a) To provide a compact, easily storable device when not in use (b) To provide a lightweight rigid or semi-rigid device, which when extended, spans the distance between the eyelets of the cover when placed under the vehicle, thereby accommodating the user more fully by not requiring him or her to reach under the vehicle.

(c) To provide a self-tensioning device, which when in use snugs the cover to the vehicle.

Further objects and advantages are to provide a connecting device for fabric vehicle covers which is simple and user friendly to operate, which can be offered in any number of colors, which should prove to be a simple device to manufacture and which would be more aesthetically appealing than an unsightly rope, cable or elastic cord with hooks, particularly to those automobile aficionados that demand the very best for their vehicle.

Still further objects and advantages will become apparent from a consideration of the ensuing description and drawings.

DRAWING FIGURES

REFERENCE NUMERALS IN DRAWINGS

| | |
|---|---|
| 10 | primary tube |
| 10a | primary tube second open end |
| 10b | primary tube first open end |
| 12 | rod |
| 14 | locking mechanism |
| 16 | coiled compression spring |
| 18 | end cap having center aperture |
| 20a | hook device |
| 20b | hook device |
| 22a | telescoping tube |
| 22b | telescoping tube |
| 22c | telescoping tube |
| 24 | machined groove |
| 26 | machined bead |

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment will be described, the details may be changed without departing from the invention, which is defined by the claims.

Figure 1:
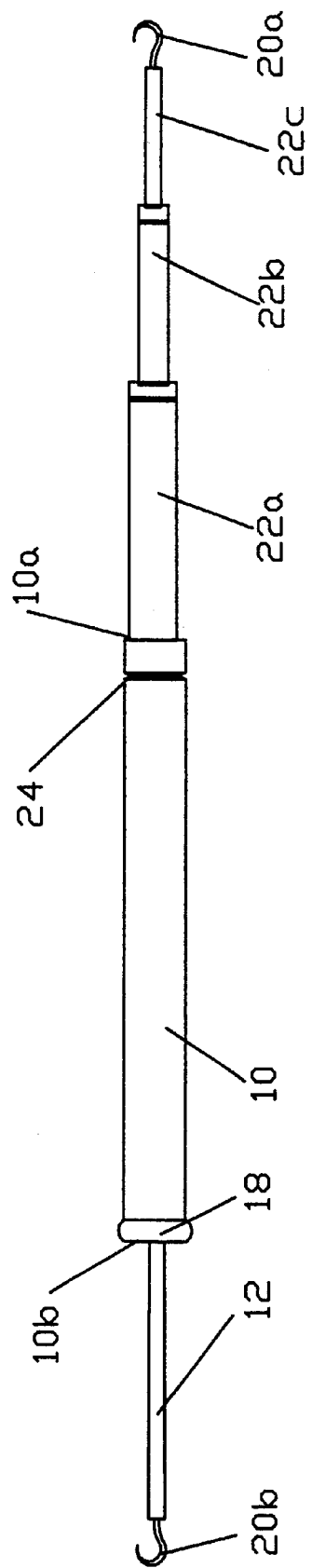
FIG. 1 is a perspective view of the connecting device in the extended and locked position.
Figure 3:
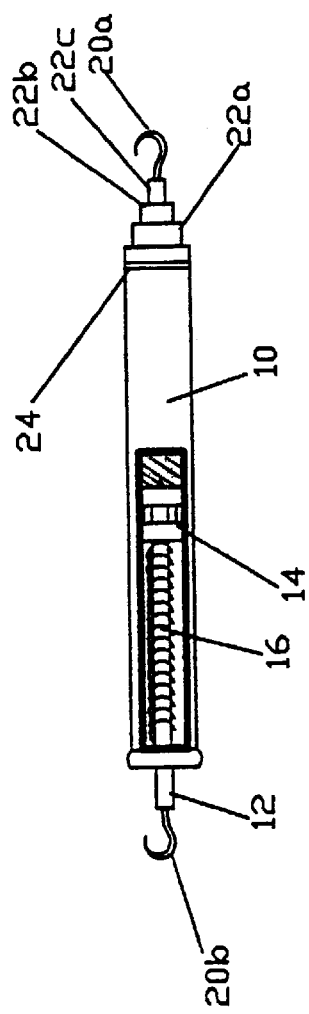
FIG. 3 is a perspective view of the connecting device with a cut-out showing a coiled compression spring and cam-type locking mechanism inside of the primary tube.

With reference to FIG. 1 which illustrates the present invention in its fully extended and locked state, it can be seen that it is comprised of: a primary tube 10 which is approximately 76 cm long and which has a first open end 10a and second open end 10b, a rod 12 approximately 46 cm long, an end cap 18, a plurality of slidably connected telescoping tubes 22a, 22b, and 22c, each of which is approximately 37 cm long and a plurality of hook devices 20a and 20b. Not shown in FIG. 1 but illustrated in the cutaway portion of FIG. 3 are the final parts; a coiled compression spring 16 and a locking mechanism 14.

The preferred material for constructing primary tube 10, rod 12 and telescoping tubes 22a, 22b, and 22c is hollow aluminum tubing of various lengths and diameters.

Figure 5:
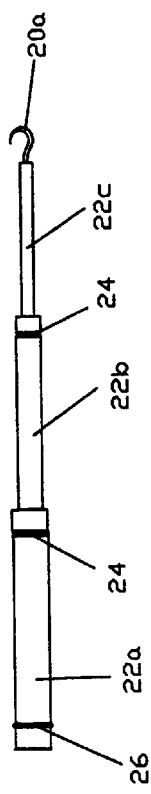
FIG. 5 shows the slideably connected plurality of extension tubes assembly with attached hook device that make-up the telescoping feature of the connecting device.

With reference now to FIG. 5, a detail of the plurality of slidably connected telescoping tubes 22a, 22b, and 22c is shown. At the outward end of telescoping tube 22c is affixed hook device 20a. Referring back to FIG. 1, we see that these slidably connected telescoping tubes 22a, 22b, and 22c, extend from or retract into first open end 10a of the longer primary tube 10 which is approximately twice the length of telescoping tubes 22a, 22b, and 22c.

Figure 6:
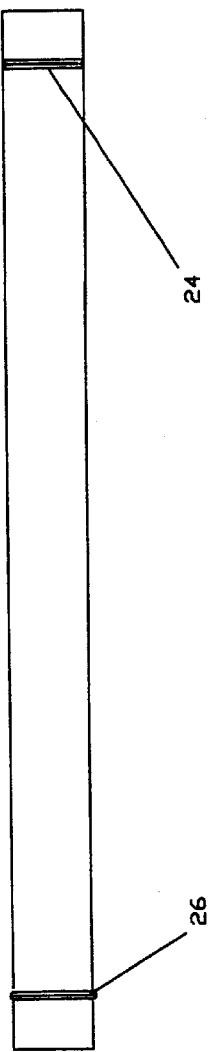
FIG. 6 shows a section of aluminum tubing having at one end a machine formed bead or protrusion and at the other end, a machine formed groove or depression.

Each individual section comprising the above described telescoping feature of the present invention must of course remain partially within each neighboring section when they are extended one from another. While the art of creating telescoping tubes is known and varied, a preferred method will be described here briefly for clarity. With reference to FIG. 6, a detail of an annular bead 26 and an annular groove 24 (which creates a corresponding annular protrusion of the inner wall) are shown on a section of hollow aluminum tubing. Thus in a telescoping section comprising two or more tubes, it can be understood that each annular groove 24 embedded in a tube interacts with annular bead 26 of the inner tube to retain that tube.

Figure 2:
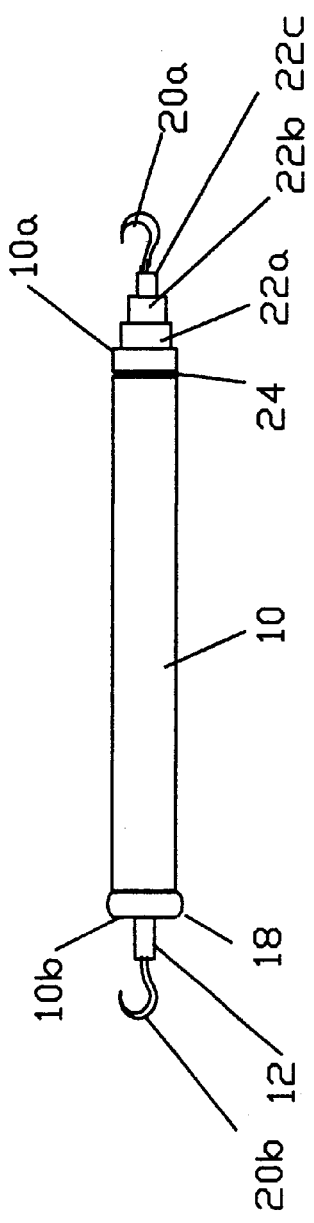
FIG. 2 is a perspective view of the connecting device as contemplated by the present invention in a closed position.

With reference to FIG. 1 and FIG. 2 it can be seen that rod 12 extends from second open end 10b of primary tube 10. Affixed at the inward end (that portion which stays within primary tube 10) of rod 12 is locking mechanism 14 (FIG. 3). One such locking mechanism of the type contemplated for use in the present invention is know as a "Twist Lock", which is a cam-lock design and is available from Valley Tool and Die, Inc., 10020 York Theta Drive, North Royalton, Ohio 44133.

Locking mechanism 14 has an outside diameter just smaller than the inside diameter of primary tube 10. At the outward end of rod 12 is affixed hook device 20b.

Figure 4:
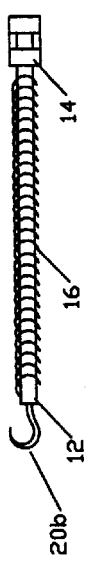
FIG. 4 shows the tension rod assembly as contemplated by the current invention with spring, locking mechanism and hook device connected.

With reference now to FIG. 4, it can be seen in detail, rod 12 which is slightly longer than half the length of primary tube 10 with locking mechanism 14 affixed at one end and hook device 20b affixed at the other end. Coiled compression spring 16, which is approximately the same length as rod 12 can be seen in place around rod 12. Referring back to FIG. 1 and FIG. 2, we also see end cap 18, which is affixed at end 10b of primary tube 10. End cap 18 has a hole in its center slightly larger than the outside diameter of rod 12, thus allowing rod 12 to slide freely, but enclosing coiled compression spring 16 inside of primary tube 10. Coiled compression spring 16 whose inward end communicates with the shoulder of locking mechanism 14 and whose outward end communicates with the inside portion of end cap 18, creates a tension when rod 12 is pulled outwardly from the bore of primary tube 10. If rod 12 is pulled straight out of the bore of primary tube 10 (FIG. 1), or allowed to return into the bore with the urging of coiled compression spring 16 (FIG. 2), locking mechanism 14 has no affect. It merely slides in the bore. If however rod 12 is pulled out and slightly twisted in a clock-wise rotation, a rotateably mounted axle-centric section of locking mechanism 14 will frictionally engage the inner wall of primary tube 10 thereby holding rod 12 in an extended state against the urging of coiled compression spring 16 (FIG. 1). When rod 12 is twisted slightly in a counter-clockwise direction, locking mechanism 14 relaxes its frictional hold on the interior wall of primary tube 10 and coiled compression spring 16, which has been compressed, urges rod 12 back into the bore of primary tube 10 (FIG. 2).

Operation

The manner of using the connecting device of the present invention is fairly straight forward. A user of the device would of course first install a fabric cover onto their vehicle. The user would then extend telescoping tubes 22a, 22b, and 22c out of primary tube 10. The user would then grasp tension rod 12 with one hand while holding primary tube 10 with the other hand. The user would then pull outwardly on rod 12 the full length of travel. Coiled compression spring 16 inside of primary tube 10 is thus compressed. With rod 12 now fully extended, the user would twist rod 12 slightly in a clock-wise rotation, causing the cam action of locking mechanism 14 to engage tightly against the interior wall of primary tube 10, thereby locking rod 12 in an extended state. The user would then place the now extended connecting device in a position on the parking surface under the covered vehicle from side to side, so that hooks 20a and 20b would be directly below the eyelets of the cover and with rod 12 on the driver's side of the covered vehicle. From the passenger side, the user would lift the connecting device up and engage hook 20a with the eyelet of the cover on that side. The user would then move to the driver's side and lift that side of the device up. The user would then slightly twist tension rod 12 in a counter clockwise rotation, thereby releasing the grip that locking mechanism 14 has on the interior wall of primary tube 10. The compressed spring 16 then urges rod 12 back into primary tube 10 while the user engages hook 22b with the cover eyelet on that side. The shorter length of the connecting device relative to the distance between the cover eyelets prevents the spring from completely relaxing thereby creating the tension necessary to "snug" the cover to the vehicle.

When the user wishes to remove the cover from the vehicle, hook 20a or 20b on either side of the vehicle is grasped and pulled against the tensioned state of the device. The hook is released from the eyelet on that side. At that time, coiled compression spring 16 fully relaxes as rod 12 returns to its unextended state. The user then releases the hook from the eyelet on the other side and removes the connecting device from under the vehicle. Telescoping tubes 22a, 22b, and 22c are then compressed back into primary housing tube 10. The cover is removed from the vehicle and it and the connecting device are stored away.

Conclusion, Ramifications, and Scope

Accordingly, the reader will see that the connecting device of the present invention is preferable in many respects to the rope, cable, or elastic cord with hooks that are presently in use. Although the description above contains many specificities, these should not be construed as limiting the scope of the invention but as merely providing illustrations of some of the presently preferred embodiments of this invention. For example, FIG. 1 and FIG. 2 show three slidably connected telescoping tubes 22a, 22b, and 22c and while approximate sizes are given in the above description for the sake of clarity, it is possible that any number and variety of sizes and lengths may be used in the same manner to create a connecting device of varying lengths and diameters. With continued consideration of telescoping tubes 22a, 22b, and 22c, it should be understood that one or more spring biased latch buttons, which are outwardly extendable into one or more latch apertures of a neighboring section of tubing, could be installed. The use of latch buttons may be desirable in certain applications where the outward travel of one or more telescoping sections so equipped needs to be limited, for example, a very narrow vehicle or other narrow application.

The preferred construction material of the slidably connected telescoping tubes 22a, 22b, 22c, primary tube 10, and rod 12 is hollow aluminum tubing as previously stated. A number of vibrant colored dyes are available which can be added to an anodizing solution, which the aluminum tubes could be introduced into thus making the connecting device attractive to consumers. The use of aluminum tubing is also preferable because of the proximity of the connecting device when in use to the undercarriage of an automobile where the possibility exists of contacting hot exhaust systems. In addition, aluminum tubing is lightweight, readily available in many sizes, and easy to work with. However, it is to be understood that other suitable tubing such as PVC, fiberglass, or carbon fiber could be used in a like manner resulting in a connecting device of semi-rigid construction. This may be desirable for some applications such as personal watercraft or boats. With consideration of these two examples, which of course are V-shaped, it can be understood that two or more connecting devices could be hooked together, for example, at the keel area, where a fairly abrupt angle change occurs.

Finally, while FIG. 1 through FIG. 5 show common hook devices 20a and 20b used as the gripping apparatus of the connecting device, it is to be understood that a gripping apparatus with locking or lockable features is contemplated.

Thus the scope of the invention should be determined by the appended claims and their legal equivalents, rather than by the example given.

I claim:

1. A telescoping and tensioning connecting device comprising:
   a tubular housing of through bore construction having a first open end and second open end;
   a first independent tubular member slidably connected within and projectable from said first open end of said tubular housing;
   tension means bias to the outward pulling of said first independent tubular member from said first open end of said tubular housing;
   locking means for holding said first independent tubular member against said tension means when said first independent tubular member is in an outward extension position, said locking means and said outward extension position responsive to a user;
   a first gripping device affixed to the outward end of said first independent tubular member;
   a plurality of second dependent tubular members slidably connected within said tubular housing, and inter-received one into another in a telescoping manner, having the ability of being extendable outwardly from or retractable into said second open end of said tubular housing, responsive to a user;
   and a second gripping device affixed at the outward end of the outward most of said second dependent tubular members.

2. A device according to claim 1, further comprising an end cap affixed at said first open end of said tubular housing, said end cap having a through opening in its center large enough whereby said first independent tubular member may move outwardly and inwardly.

3. A device according to claim 2, wherein said end cap encloses said tension means within said tubular housing.

4. A device according to claim 1, wherein said locking means may be a cam-lock affixed to that end of said first independent tubular member which is inside of said tubular housing.

5. A device according to claim 3, wherein said tension means comprises a coiled compression spring.

6. A device according to claim 5, wherein said first independent tubular member passes through said coiled compression spring.

7. A device according to claim 1, wherein said first gripping device may be a hook, said hook remaining outside of said tubular housing.

8. A device according to claim 1, wherein said second gripping device may be a hook, said hook remaining outside of said tubular housing.

9. A device according to claim 1, wherein said first gripping device may be equipped with a locking means.

10. A device according to claim 1, wherein said second gripping device may be equipped with a locking means.

* * * * *